(12) United States Patent
Sono

(10) Patent No.: US 8,594,045 B2
(45) Date of Patent: Nov. 26, 2013

(54) COMMUNICATION TERMINAL, COMMUNICATION SYSTEM, HANDOVER PROCESS METHOD, AND PROGRAM

(75) Inventor: Kazuya Sono, Kanagawa (JP)

(73) Assignee: KYOCERA Corporation, Kyoto (JP)

( * ) Notice: Subject to any disclaimer, the term of this patent is extended or adjusted under 35 U.S.C. 154(b) by 386 days.

(21) Appl. No.: 12/922,105

(22) PCT Filed: Mar. 12, 2009

(86) PCT No.: PCT/JP2009/054783
§ 371 (c)(1),
(2), (4) Date: Dec. 15, 2010

(87) PCT Pub. No.: WO2009/113622
PCT Pub. Date: Sep. 17, 2009

(65) Prior Publication Data
US 2011/0090867 A1    Apr. 21, 2011

(30) Foreign Application Priority Data
Mar. 13, 2008    (JP) .................... 2008-064471

(51) Int. Cl.
*H04W 4/00*    (2009.01)
(52) U.S. Cl.
USPC .......................................... 370/331; 455/436
(58) Field of Classification Search
USPC .................. 370/331–334; 455/436
See application file for complete search history.

(56) References Cited

U.S. PATENT DOCUMENTS

| | | | |
|---|---|---|---|
| 6,539,233 B1 * | 3/2003 | Taketsugu | 455/522 |
| 6,865,167 B2 * | 3/2005 | Famolari et al. | 370/331 |
| 7,260,074 B2 * | 8/2007 | Vare | 370/331 |
| 7,848,241 B2 * | 12/2010 | Natarajan et al. | 370/238 |
| 7,970,401 B2 * | 6/2011 | Donovan et al. | 455/436 |
| 8,046,583 B2 * | 10/2011 | Taniguchi | 713/171 |
| 2003/0050061 A1 * | 3/2003 | Wu et al. | 455/432 |
| 2007/0171867 A1 * | 7/2007 | Kim | 370/331 |
| 2009/0034472 A1 * | 2/2009 | Purnadi et al. | 370/331 |

FOREIGN PATENT DOCUMENTS

| | | |
|---|---|---|
| JP | 10-94022 A | 4/1998 |
| JP | 2002-112308 A | 4/2002 |
| JP | 2003-274437 A | 9/2003 |

(Continued)

OTHER PUBLICATIONS

Office Action dated Aug. 19, 2011, issued for counterpart Korean Application No. 10-2010-7022462.

(Continued)

*Primary Examiner* — Phuc Tran
(74) *Attorney, Agent, or Firm* — Procopio, Cory, Hargreaves & Savitch LLP

(57) ABSTRACT

A mobile telephone which can perform communication by establishing a plurality of sessions includes: a hand over HO judgment portion which judges whether to perform a handover (HO); and an HO process portion which performs an HO processing. The HO processing portion includes: a priority decision portion which decides priority of a session to be subjected to an HO when a plurality of sessions are performing communication if the HO judgment result shows that the HO process is to be executed; and an HO execution portion which executes an HO of the session according to the decided priority. The HO processing portion further includes an HO reservation portion which reserves a connection request or a disconnection request occurred during the HO process.

20 Claims, 4 Drawing Sheets

(56) References Cited

FOREIGN PATENT DOCUMENTS

| JP | 2006-526356 A | 11/2006 |
| KR | 10-2005-0063416 A | 6/2005 |
| WO | 2004/112419 A1 | 12/2004 |

OTHER PUBLICATIONS

International Search Report dated Jun. 2, 2009 issued by the Japanese Patent Office for International Application No. PCT/JP2009/054783.

\* cited by examiner

COMMUNICATION TERMINAL, COMMUNICATION SYSTEM, HANDOVER PROCESS METHOD, AND PROGRAM

TECHNICAL FIELD

The present invention relates to a handover processing technology in mobile communication.

The present invention, more specifically, relates to a handover processing technology in a mobile phone or other communication terminal able to establish a plurality of sessions for communication in a wireless communication system.

"Session" means a series of communications necessary for executing one processing routine.

"Handover (HO) processing" means processing for switching connection to a base station in a destination cell at the time of movement from one cell to another in a state where a mobile speech or mobile communication is carried out.

BACKGROUND ART

Recent mobile phones and other communication terminals can perform data communication by WEB (World Wide Web) connection and so on, in addition to voice communication, transmission/reception of e-mails.

At the time of such data communication, in order to handle high-speed data communication, a multi-link protocol handling a plurality of data links as one logical link routine is being widely utilized.

To enable continuous communication with a network through a base station arranged in a new cell, even when the communication terminal leaves the cell of a base station being communicated with, a mobile phone or other mobile communication terminal performs handover processing in which it searches for the new base station for connection and switches connection to the base station corresponding to its own position during communication.

For example, according to the mobile wireless communication system and wireless communication use mobile terminal disclosed in Patent Document 1, data is transmitted to a base station through a master communication apparatus and a slave communication apparatus. When the slave communication apparatus performs handover processing, the master communication apparatus hands over the communication to a base station for which a call connection is not made.

Patent Document 1: Japanese Patent Publication (A) No. 2002-112308

DISCLOSURE OF INVENTION

Problems to be Solved by the Invention

If connecting the above explained mobile phone or other mobile communication terminal to a personal computer (PC) by using a USB (Universal Serial Bus) or Bluetooth® etc. and utilizing the phone or terminal as a modem, WEB connection using the PC, a television conference according to VoIP (Voice over Internet Protocol), data transfer according to FTP (File Transfer Protocol), and so on become possible as well.

However, for example, when running a plurality of sessions wherein communication such as the VoIP where guarantee of communication is requested and data communication such as by the FTP are mixed, if handover processing is performed along with movement of the mobile phone between cells, it suffers from the disadvantage that a transmission delay will occur in the communication where guarantee of communication is requested along with the handover processing.

Further, if a request for connection to a wireless communication network is made for performing a session from a data terminal etc. connected to the mobile phone or other communication terminal during handover processing, that connection request will be rejected and a connection request made by the user for performing the session will become necessary again, so it suffers from the disadvantage that the load of the data terminal becomes large.

From such a viewpoint, there has been desired a communication terminal, handover processing method, communication system, and program reducing transmission delay accompanying handover processing and enabling quick and high-quality data communication.

Further, there has been desired a communication terminal, handover processing method, communication system, and program capable of avoiding repeated requests for connection to the network for performing a session during the handover processing.

Means for Overcoming the Problems

According to the present invention, there is provided a communication terminal communicating with a network through a base station used for mobile communication, establishing a plurality of sessions, and capable of communication, the communication terminal having a handover judgment portion for judging whether or not handover is to be performed; and a handover processing portion for deciding priority orders of a plurality of sessions for handover when executing handover based on the judgment result of the handover judgment portion and when there are a plurality of the sessions in communication, and for performing the handover processing from the session having the highest priority order according to the decided priority orders.

Preferably, the handover processing portion computes scores based on the amounts of wireless resources of the sessions for the handover, and decides the priority orders in sequence from the session having the largest computed score.

Further, preferably, the handover processing portion judges for each session whether or not the session for handover is a session for which communication quality is to be guaranteed and, when it is the session for which communication quality is to be guaranteed, changes the value of its score so as to become a score larger than the score based on the amount of wireless resources of that session.

Preferably, when the request for changing a connection relationship with the network through the base station is made for a session during the handover processing, the handover processing portion reserves the request for changing the connection relationship until the handover processing in progress is completed.

Preferably, the request for changing a connection relationship with the base station includes a connection request for newly connecting a session, or a disconnection request for disconnecting an existing session, and wherein the handover processing portion processes the disconnection request for disconnecting an existing session with priority when there are both of the connection request for newly connecting a session and the disconnection request for disconnecting an existing session when resuming the reservation request for changing the connection relationship with the base station after the handover processing in progress completed.

Preferably, the handover processing portion performs processing for a reservation connection request for newly connecting a session after processing the disconnection request for disconnecting the existing session.

Further, according to the present invention, there is provided a mobile communication terminal communicating with a network through a base station used for mobile communication, establishing a plurality of sessions for communication and enabling the communication, the mobile communication terminal comprising a handover judging means for judging whether or not handover is to be performed and a handover processing means for deciding priority orders of a plurality of sessions for handover when executing handover based on the judgment result of the handover judging means and when there are a plurality of sessions in communication and for performing the handover processing from the session having the highest priority order according to the decided priority orders.

Further, according to the present invention, there is provided a wireless communication system provided with a wireless communication network; a plurality of base stations connected to the wireless communication network in order to realize mobile communication; and a communication terminal which can be wirelessly connected to the plurality of base stations, the communication terminal being configured communicate with one of the plurality of base stations, to establish a plurality of sessions and to enable the communication, and the communication terminal having; a handover judgment portion for judging whether or not handover is to be performed; and a handover processing portion for deciding priority orders of a plurality of sessions for handover when the handover is executed based on the judgment result of the handover judgment portion and when there are a plurality of sessions in communication and for performing the handover processing from the session having the highest priority order according to the decided priority orders.

Further, according to the present invention, there is provided a handover processing method of a mobile communication terminal, communicating with a network through a base station used for mobile communication, establishing a plurality of sessions for communication and enabling the communication, including; a handover judgment step of judging whether handover is to be performed; and a handover processing step of deciding priority orders of a plurality of sessions for handover when the handover is executed based on the judgment result in the handover judgment step and when there are a plurality of sessions in communication and of performing the handover processing from the session having the highest priority order according to the decided priority orders.

Further, according to the present invention, there is provided a handover processing program making functions of communicating with a network through a base station used for mobile communication, establishing a plurality of sessions for communication, and enabling the communication, a computer in a communication terminal execute, the handover processing program having; a handover judgment routine of judging whether or not handover is to be performed; and a handover processing routine of deciding priority orders of a plurality of sessions for handover when handover is executed based on the judgment result in the handover judgment routine and when there are a plurality of sessions in communication and of performing the handover processing from the session having the highest priority order according to the decided priority orders.

Effects of the Invention

According to the present invention, transmission delay due to handover processing and rejection of session connection requests during handover processing are reduced, so high-speed and high-quality data communication can be performed.

According to the present invention, it becomes possible to avoid repeated requests for connection for performing new sessions during handover processing, so the load of the communication terminal is reduced.

EXPLANATION OF REFERENCES

1 . . . communication system, 10 . . . mobile phone, 11 . . . communication portion, 12 . . . operation portion, 13 . . . audio processing portion, 14 . . . speaker, 15 . . . microphone, 16 . . . display portion, 17 . . . memory portion, 18 . . . control portion, 180 . . . main control portion, 181 . . . handover judgment portion, 182 . . . handover processing portion, 1821 . . . priority order decision portion, 1822 . . . handover execution portion, 1823 . . . handover reservation portion, 19 . . . bus control portion, 20A to 20C . . . base stations, 30 . . . wireless communication network, 40 . . . server, and 50 . . . data terminal (PC).

MODES FOR CARRYING OUT THE INVENTION

Embodiments of the communication terminal, handover processing method, program, and communication system of the present invention will be explained with reference to the attached drawings.

Figure 1:
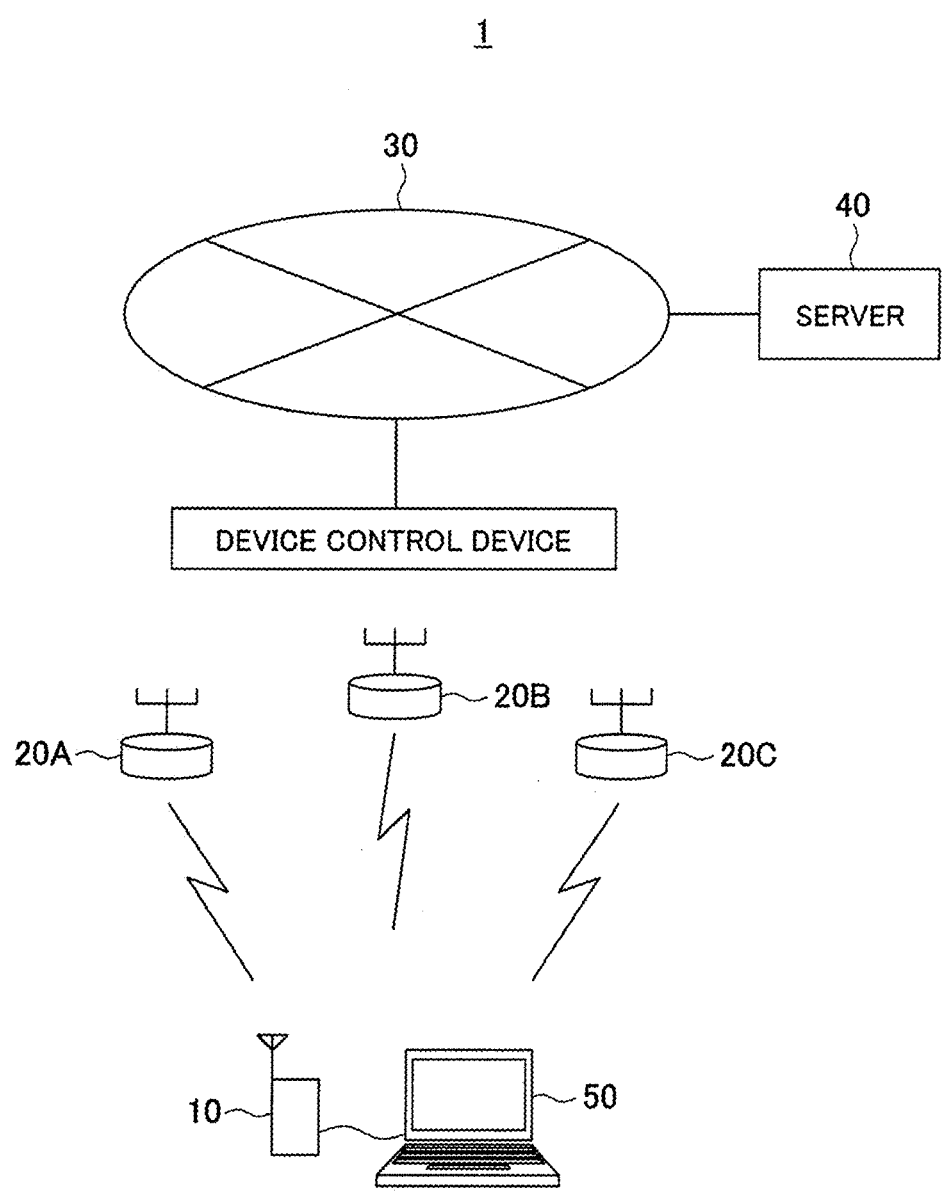
FIG. 1 A view showing an example of the configuration of a communication system to which a mobile phone according to an embodiment is connected.

FIG. 1 is a view showing an example of the configuration of a communication system 1 to which a mobile phone is connected, as an embodiment of the present invention.

The communication system 1 is configured by a mobile phone 10, a plurality of base stations 20A to 20C arranged in cells (communication regions) so that the mobile phone 10 can perform mobile communication through a network, a wireless communication network 30, a server 40, and a data terminal 50.

Note that, among the wireless communication network 30 and the plurality of base stations 20A to 20C, a base station control device for controlling the plurality of base stations is provided. In the present DESCRIPTION, the description of the functions and/or processing of a base station means, the functions and/or processing of the base station and base station control device.

The mobile phone 10 is connected to any of the base stations 20A to 20C in the cell in which the mobile phone 10 (hereinafter referred to as the "terminal itself") is located, by, for example, the TDMA (Time Division Multiple Access)/ TDD (Time Division Duplex) used in the iBurst® system or link adaptation to thereby become a communicatable with the station. At this time, the mobile phone 10 receives a radio wave signal from a neighboring base station, that is, the nearest base station among the base stations 20A to 20C, the radio wave signal including an identification (ID) number of the nearest station, and performs the handover processing for switching the connection with a base station to be connected while communicating based on the ID number of this base station.

"Handover processing" means processing where, as explained above, when the mobile phone 10 is connected to a certain base station, for example, the base station 20A, and moves to a different cell during communication, the connection is switched to a base station of the cell of the destination of that movement, for example, the base station 20B.

When the mobile phone 10 is connected to a data terminal 50 by a USB or Bluetooth, the mobile phone 10 functions, for example, as a MODEM performing transmission/reception processing with the base station, and has the function of enabling the data terminal 50 to execute audio communication according to VoIP, data transfer according to FTP, and so on, through the mobile phone 10. By this function, the mobile phone 10 can perform a plurality of sessions (multi-session), for example, simultaneous use of VoIP (Voice over internet Protocol) and FTP (File Transfer Protocol).

"Session" means a unit of communications necessary for executing one processing routine.

The mobile phone 10 connected to the data terminal 50 can communicate with the server 40 or other communication terminals through the new base station connected by the handover processing and the wireless communication network 30.

The mobile phone 10 connected to the data terminal 50 cooperates with the data terminal 50, and has functions enabling, for example, audio speech, production of e-mails, transmission/reception of those, and viewing of WEB sites and content data, for example, moving picture images and still images, under the control of the server 40 connected to the wireless communication network 30.

The plurality of base stations 20A to 20C arranged in each cell respectively have, for example, an adaptive array antenna. The respective base stations are arranged so that the respective cells are adjacent to each other and communicate with the mobile phone 10 located in the cell.

The base stations 20A to 20C perform broadcast transmission of identification numbers unique to the base stations by which the mobile phone 10 can identify each base station and perform the handover processing.

To the wireless communication network 30, for example, the mobile phone 10, a plurality of base stations 20A to 20C, and the server 40 are connected. This wireless communication network is able to handle, for example, audio data and packet data.

The server 40 is connected to the wireless communication network 30 and processes various types of data input/output through the wireless communication network 30, for example, audio data, character data, and moving picture data.

The data terminal 50 is configured using, for example, a personal computer (PC). When the data terminal is connected to the mobile phone 10 by the USB or Bluetooth, the mobile phone 10 functions as a MODEM. Due to that, the data terminal is connected to, for example, a not shown IP (Internet Protocol) network through the wireless communication network 30. As a result, the data terminal 50 can execute audio communication according to VoIP, data transfer according to FTP, and other processing.

Details of the mobile phone 10 will be explained with reference to FIG. 2.

Figure 2:
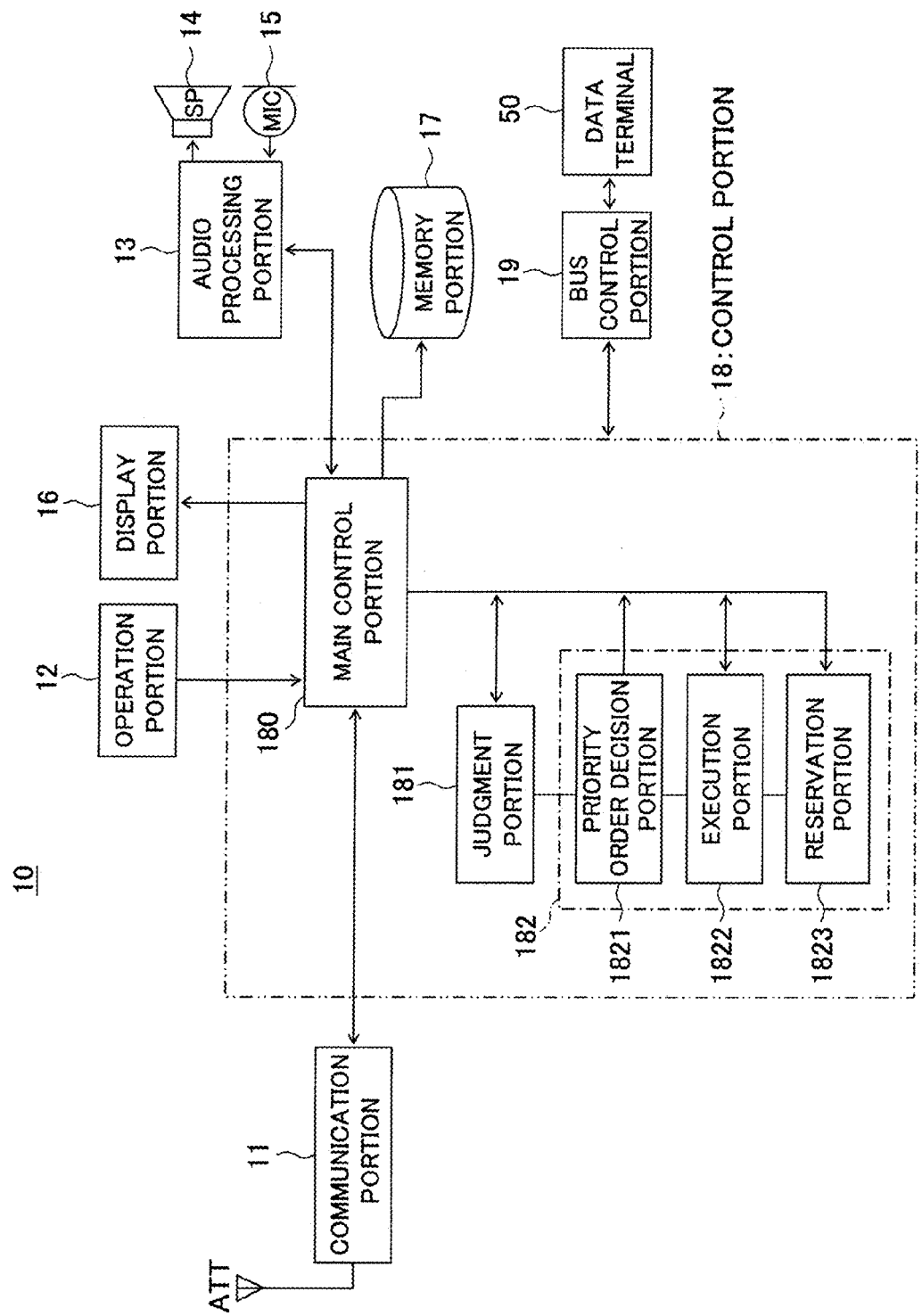
FIG. 2 A block diagram showing an example of the configuration of principal parts of the mobile phone according to the embodiment.

FIG. 2 is a block diagram showing an example of the configuration of principal parts of the mobile phone according to the present embodiment. Note, FIG. 2 illustrates only the parts related to the embodiment of the present invention for performing handover, and illustration of other parts of the mobile phone is omitted.

The mobile phone 10 has an antenna ATT, communication portion 11, operation portion 12, audio processing portion 13, speaker 14, microphone 15, display portion 16, memory portion 17, control portion 18, and bus control portion 19.

The control portion 18 is configured by a main control portion 180, handover (HO) judgment portion 181, and handover (HO) processing portion 182.

The handover judgment portion 181 performs judgment of whether or not handover is to be performed.

The handover processing portion 182 executes handover processing when it is judged that handover is to be performed at the handover judgment portion 181.

The handover processing portion 182 has a priority order decision portion 1821 and handover execution portion 1822. Further, the handover processing portion 182 may have a handover reservation (holding) portion 1823 as well.

The communication portion 11 receives identification (ID) numbers of base stations which performed broadcast transmission by the plurality of base stations 20A to 20C through the respective antennas ATT, and wirelessly communicates with the base station with a matching ID number of the base station.

The communication portion 11 has a single antenna ATT in the shown example, but may be configured with a plurality of antennas, for example, two antennas, to enable communicate for corresponding a plurality of channels (hereinafter, also referred to as "links"), for example, two channels.

The operation portion 12 has various types of keys for operation of the mobile phone 10 by a user, for example, a power key, a speak key, number keys, letter keys, direction keys, a decision key, a send key, and other keys to which various operation functions are assigned. When these keys are operated by the user, the operation portion 12 generates a signal corresponding to those keys and outputs the same as an instruction of the user to the control portion 18. The control portion 18 stores information which indicates the correspondence between each operation and each key.

The audio processing portion 13 applies encoding, digital-to-analog (D/A) conversion, amplification, and other signal processing to the audio data supplied from the control portion 18, and outputs an analog audio signal to the speaker (SP) 14. The audio processing portion 13 amplifies the audio signal input from the microphone (MIC) 15, performs analog-to-digital (A/D) conversion, and further applies encoding or other processing to convert the same to digital audio data, and outputs the result to the control portion 18.

The display portion 16 is, for example, a liquid crystal display panel, an organic EL (electro-luminescence) panel, or other display device, and displays various information in accordance with a video signal, character signal, and so on supplied from the control portion 18.

The memory portion 17 is configured by, for example, a nonvolatile memory device such as a flash memory, SRAM, DRAM, or other random accessible memory device.

The memory portion 17 stores an operating system (OS) executed by the control portion 18 and various types of application programs (AP) for executing various types of processing of the mobile phone 10. The memory portion 17 further stores output results of the control portion 18, temporary data utilized in the process of accomplishing the AP executed by the control portion 18, and other various types of data.

The control portion 18 totally controls the entire operation of the mobile phone 10. Namely, the control portion 18 controls processing of components in the mobile phone 10 through the main control portion 180 so that various types of processing of the mobile phone 10, for example, audio speech processing performed through the wireless communication network 30, production of e-mails and transmission/reception processing of those, control of viewing of WEB sites, and so on are executed in a suitable sequence in accordance with the operation of the operation portion 12 by the user.

As for the processing of components described above, there may be, for example, transmission/reception processing of radio wave signals at the communication portion 11, input/output processing of audio at the audio processing portion 13, display processing of an image on the display portion 16, access processing with the memory portion 17, and so on.

The control portion 18 is provided with a computer, for example, a microprocessor, executing the processing based on the program stored in the memory portion 17, for example, the operating system (OS) and application program (AP). The control portion 18 having the computer executes the processing exemplified above according to the sequence (processing routine) instructed by the AP.

Namely, the control portion 18 having the computer sequentially reads instruction codes from the OS or AP stored in the memory portion 17 and executes the processing thereof.

The handover judgment portion 181 judges whether or not the handover is to be executed based on the identification (ID) numbers of the plurality of base stations received by the communication portion 11 through the antenna ATT.

When it is judged at the handover judgment portion 181 that the handover is to be executed, the handover processing portion 182 is driven by the main control portion 180 and performs the handover processing explained in detail below.

Specifically, the handover judgment portion 181 judges whether or not the handover processing portion 182 is in a state of the handover. When it is not in the state of the handover processing, the handover judgment portion 181 compares whether or not the identification (ID) number of the base station received this time and the ID number of the base station received the last time coincide.

When the two ID numbers of the base stations are coinsided in the comparison, it is deemed the mobile phones 10 are located in the same cell, and it is not necessary to perform the handover processing. Therefore, when there is remained the processing reserved by the request reservation processing at the time of processing of the handover, the handover processing portion 182 executes the processing for this request.

When the ID numbers of base stations are not coincided in the comparison, the processing is moved to the processing of the handover processing portion 182, and the handover processing portion 182 performs processing for deciding the priority orders of handover.

The handover processing portion 182 performing the processing explained above is configured by, for example, as exemplified in FIG. 2, a priority order decision portion 1821 deciding the priority orders of the handover, and a handover execution portion 1822 executing the handover processing. Further, the handover processing portion 182 can have, in addition to the priority order decision portion 1821 and handover execution portion 1822, a handover reservation portion 1823 for reserving (holding off) a request for the handover processing.

The handover execution portion 1822 has a function of executing the handover processing for a session to be made handover processing, by the same method as the usual method. Accordingly, an explanation of the handover processing itself is omitted. Note that, in the present embodiment, in addition to the function of executing such usual handover processing, the following processing is carried out as well.

When the mobile phone 10 is handed over to a base station to be newly connected to, based on the judgment result at the handover judgment portion 181 of whether or not handover should be executed, the handover execution portion 1822 starts the operation under the control of the main control portion 180, and executes the handover processing of sessions based on the handover priority orders decided by the priority order decision portion 1821 explained later. This is referred to as the "handover processing".

When the handover processing is executed as a result of judgment at the handover judgment portion 181, the priority order decision portion 1821 scores (digitizes) each session for which the communication is established, based on the "amount of wireless resources" and decides the priority orders of sessions for handover. This is referred to as the "handover priority order decision processing".

"Wireless resources" means resources in the wireless communication system which are required for performing a certain session through the communication system 1. Namely, "the wireless resources" means hardware, software, data, etc., secured for smoothly performing a certain session.

Specifically, the priority order decision portion 1821 judges whether or not the session for handover is a guaranteed communication quality type session for which a high communication quality must be guaranteed, for example, VoIP.

When that session is not the guaranteed communication quality type, the priority order decision portion 1821 detects the amount of wireless resources of the session for which the communication is established and defines the amount of wireless resources at this time as the score.

Note that, when the session is the guaranteed communication quality type, the priority order decision portion 1821 sets a value of the maximum usable wireless resource capacity of the session plus a predetermined value $\alpha$, for example, 10, as the score (addition processing). Alternatively, the priority order decision portion 1821 sets a value of the wireless resource capacity of the session multiplied by a predetermined coefficient $\beta$, for example, 5.0, as the score (weighting processing). In this way, the priority order decision portion 1821 computes the value of the score so that the priority order is made higher for the guaranteed communication quality type session and the handover processing is performed with priority.

In this way, by performing computations for making the value of the score of the guaranteed communication quality type session larger, the priority order is made higher and the priority order of the handover processing can be made higher.

The handover reservation portion 1823 judges whether or not a request for connection to the network for a new session or a request for disconnection of a session from the network for an existing session occurs during the handover processing at the handover execution portion 1822. These connection request and disconnection request will be referred to together as a "connection change request".

For example, where a connection request concerning a session or a disconnection request for a session is generated from the data terminal 50, the handover reservation portion 1823 reserves (holds off) the request until the handover processing is completed. This is referred to as "request reservation processing".

A "connection request for a new session" means a request, for example, for transmitting data of the data terminal 50 through the mobile phone 10, by a user.

A "disconnection request for a session" means, for example, a request for interrupting data transfer etc. between the mobile phone 10 and the data terminal 50, or, for example, interrupting data transfer etc. between the data terminal 50 through the server 40 and the mobile phone 10, by the user.

After the handover processing at the handover execution portion 1822, when restarting the processing of the reservation requests, the handover reservation portion 1823 processes a disconnection request for a session with priority when the connection request for the session and the disconnection request for the session are mixed.

The bus control portion 19 performs conversion and control of the communication protocol, for example, FTP in order to transmit/receive data between the mobile phone 10 and the data terminal 50.

The operation of the mobile phone 10 will be explained next with reference to FIG. 3 and FIG. 4 focusing on the handover processing of the mobile phone 10.

Figure 3:
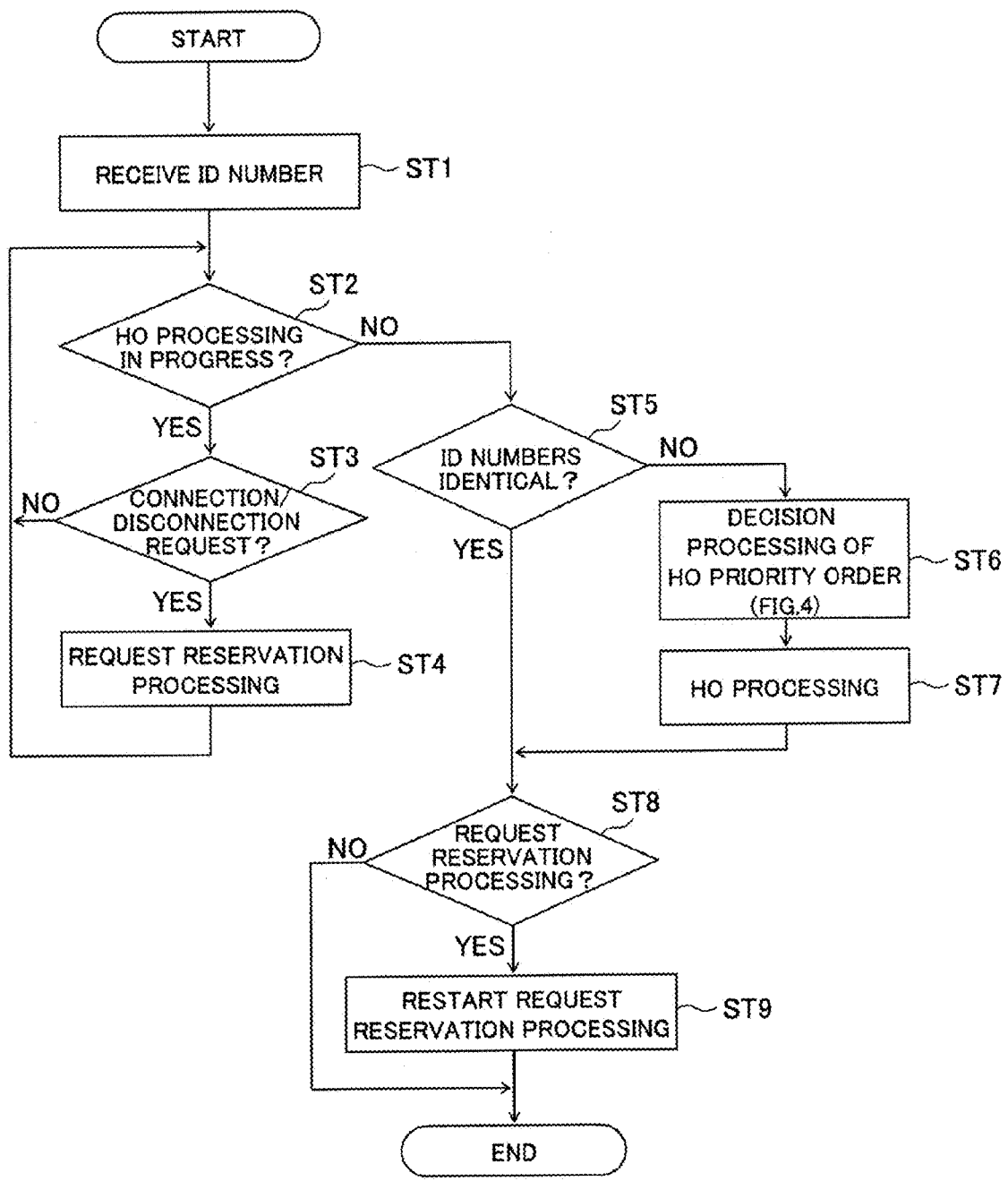
FIG. 3 A flow chart showing operation of the mobile phone according to the embodiment.

FIG. 3 is a flow chart showing the operation of the mobile phone according to the present embodiment. FIG. 4 is a flow chart showing the decision processing (step ST6) of the handover priority order shown in FIG. 3 in detail.

In the following description, as an example, it is assumed that the data terminal 50 is connected to the mobile phone 10, both of the mobile phone 10 and the data terminal 50 are positioned in the cell of the base station 20A, and communication of a plurality of sessions is established.

As shown in FIG. 3, the communication portion 11 of the mobile phone 10 receives the identification (ID) number of the base station that the base station 20A performs broadcast transmission, as a radio wave signal (step ST1). The ID number of the base station 20A is defined as "n" (ID–No=n).

The handover judgment portion 181 in the control portion 18 of the mobile phone 10 judges whether or not handover (HO) processing is in progress (step ST2).

When the judgment result of the handover judgment portion 181 at step ST2 in progress of the handover processing (YES), the handover reservation portion 1823 in the handover processing portion 182 judges whether or not a connection request for new session or a disconnection request for a session for the current session, issued from the data terminal 50 (step ST3).

When there is no the connection request for the session or the disconnection request for the session from the data terminal 50 at step ST3 (NO), the processing of step ST2 at the handover judgment portion 181 is executed again.

When there is the connection request for the session or the disconnection request for the session from the data terminal 50 (YES), the handover reservation portion 1823 in the handover processing portion 182 reserves the request (step ST4) until the handover processing by the handover execution portion 1822 is completed, then the processing of step ST2 is executed again by the handover judgment portion 181.

On the other hand, when the handover processing is not in progress at step ST2 (NO), the handover judgment portion 181 compares the ID number "n" of the base station 20A received at step ST1 and the ID number of the base station at the time of the last reception (for example, the ID number of the base station at the last time defined as (n-1)) (step ST5).

When the ID number "n" of the base station 20A and the ID number (n-1) of the base station received the last time do not match at step ST5, this means that the mobile phone 10 has moved into the cell of, for example the neighboring base station 20B or base station 20C. In this case, the priority order decision portion 1821 in the handover processing portion 182 executes processing for deciding the handover priority orders shown in FIG. 4.

Figure 4:
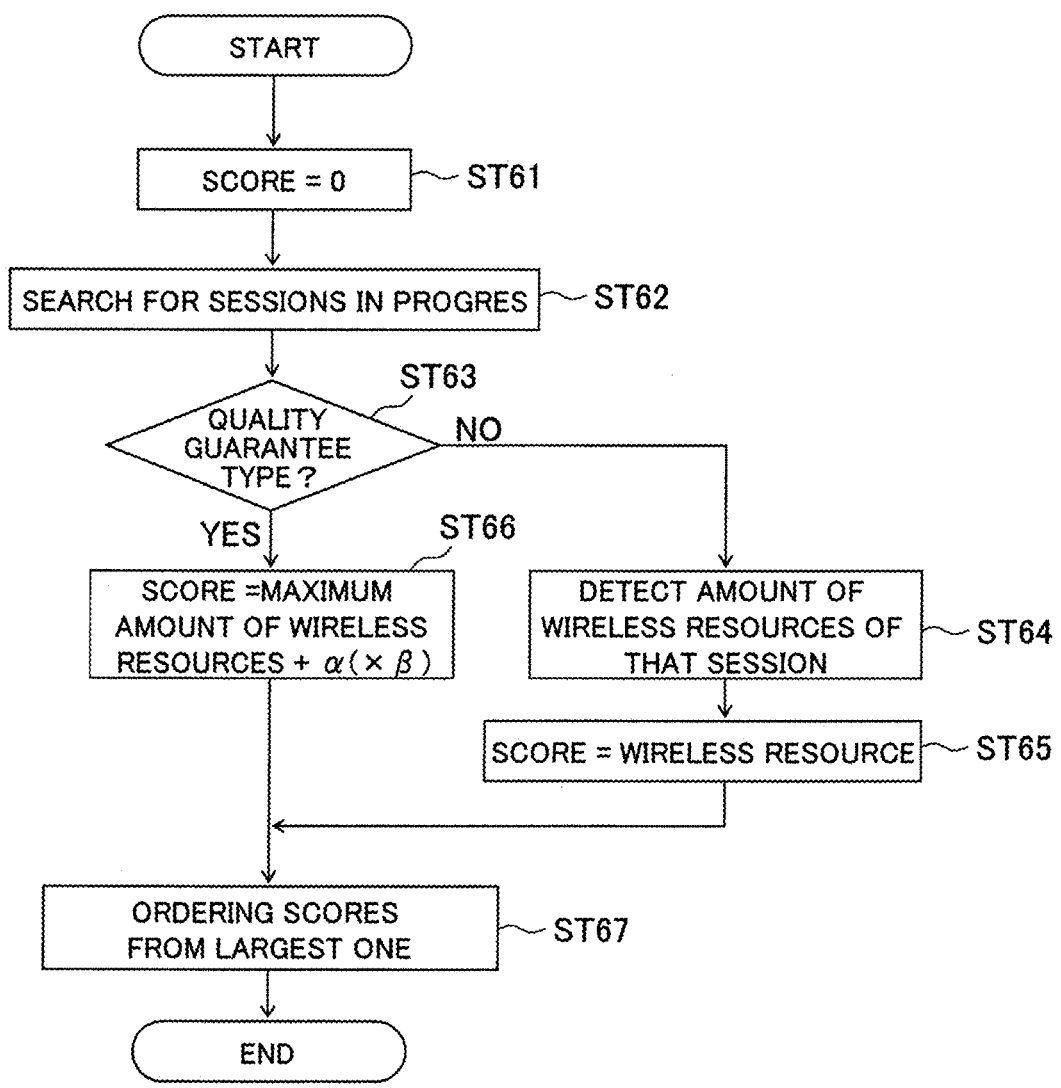
FIG. 4 A flow chart showing handover priority order decision processing (step 6) shown in FIG. 3 in detail.

As shown in FIG. 4, the priority order decision portion 1821 initializes all of the scores for the sessions to 0 (step ST61) and searches for sessions which are established at present (step ST62).

This search for sessions is, for example, search for sessions stored in the memory portion 17 of the mobile phone 10.

Referring to FIG. 4, it is assumed that the processing of step ST62, for example, found three sessions. The first session is described as Sn1, the second session is described as Sn2, and the third session is described as Sn3. The scores for sessions are described as SCORE1, SCORE2, and SCORE3.

After the search of sessions at step ST62, the priority order decision portion 1821 judges whether or not the first session Sn1 is a guaranteed communication quality type guaranteeing the communication quality (step ST63).

When the first session Sn1 is not the guaranteed communication quality type at step ST63 (NO), the priority order decision portion 1821 detects the amount of wireless resources used by the session Sn1 (step ST64) and decides the first score SCORE1 based on the amount of wireless resources (step ST65).

As the method of decision of the score, for example, the amount of wireless resources is digitized. The decided score can be stored in the memory portion 17.

On the other hand, when the first session Sn1 is the guaranteed communication quality type at step ST63 (YES), the priority order decision portion 1821 defines a value of the maximum usable amount of wireless resources in the session Sn1 plus a predetermined value α, for example, α=10, as the SCORE1 (step ST66). Namely, SCORE1 is made equal to (the maximum usable amount of wireless resources+α) (step ST66).

Alternatively, it is also possible to make SCORE1 equal to a value of the maximum usable amount of wireless resources multiplied by β (where β can be made the weight coefficient, for example, β=5.0 as well).

In this way, by performing computations for making the value of the score of the guaranteed communication quality type session larger, the priority order is made higher, and the priority order of handover processing can be made higher.

The SCORE1 (=maximum usable amount of wireless resources+α) decided at step ST66 may be a score higher than the SCORE1 decided in the processing of step ST65. Desirably, it is a score showing that the session Sn1 is the guaranteed communication quality type in the later step ST7.

Based on the type of service, for example, data transfer by VoIP or FTP, SCORE1 to SCORE3 can be decided.

After the first score SCORE1 is decided, the priority order decision portion 1821 executes the processing of steps ST63, 64, and 65, or steps ST63 and 66 explained above for the second session Sn2 and third session Sn3 as well.

As a result, it is assumed that scores become that first score SCORE1=2, second score SCORE2=15, and third score SCORE3=8.

The priority order decision portion 1821 arranges the scores SCORE1 to SCORE3 in an order becoming smaller (descending order, in other words, order from the largest value), and defines the orders of the sorted scores as the priority orders of the sessions for handover (step ST67).

By doing this, the priority orders of sessions to be handovered become higher in sessions to be which the communication quality must be guaranteed.

In this example, the sequence of sessions for handover becomes the sequence of the second session of the second SCORE2, the third session of the third SCORE3, and the first session of the first SCORE1.

After that, as shown in FIG. 3, the handover execution portion 1822 of the reservation processing portion 182 executes the handover processing in the order of sessions for handover decided by the priority order decision portion 1821, that is, the priority of sessions for which the communication quality must be guaranteed (step ST7).

Due to this, the transmission delay due to the handover processing can be reduced for the guaranteed communication quality type sessions, so high-speed and high-quality data communication can be executed.

After the handover processing by the handover execution portion 1822 is completed, the handover reservation portion 1823 judges whether or not there is a change of the processing reserved at step ST4, for example, a new connection request for a session or a disconnection request for a session (step ST8).

When there is the reserved processing at step ST8 (YES), the handover reservation portion 1823 restarts the reservation processing (step ST9).

The new connection request for the session or the disconnection processing is carried out by, for example, cooperating the main control portion 180 and communication portion 11 according to a well known method.

When there is no reservation processing (NO), the series of processing concerning the handover in the mobile phone 10 is ended.

Note, when the connection request for a session and the disconnection request for another session are mixed at step ST9, the handover reservation portion 1823 processes the disconnection request for the session with priority.

According to the present embodiment, the mobile phone 10 able to establish a plurality of sessions for communication has:

a. the handover judgment portion 181 for judging whether handover is to be performed, and b. the handover processing portion 182 having the priority order decision portion 1821 for deciding priority orders of sessions for handover when the handover is to be executed according to the judgment result of the handover judgment portion 181 and there are a plurality of sessions in communication and having the handover execution portion 1822 executing the handover processing of sessions according to the priority orders decided by this priority order decision portion 1821.

Therefore, the transmission delay due to the handover processing is reduced for the guaranteed communication quality type sessions, and high-speed and high-quality data communication can be executed.

Further, the mobile phone 10 has the handover reservation portion 1823 reserving a change request until the handover processing is completed in a case where, for example, a connection request for a session or a disconnection request for another session or other change request for a session occurs during handover processing by the handover execution portion 1822 in the handover processing portion 182. Therefore, for example, rejection of a session connection request from the data terminal during the handover processing can be reduced.

In the present embodiment, the mobile phone was exemplified as the communication terminal, but the invention can be applied to PDA (Personal Digital Assistant), game machine etc. having the same configuration as that of the present embodiment as well.

In the communication terminal according to the present embodiment, for realization of functions provided in the components of the control portion 18, those functions may all be realized by software or a program operating in the computer or partially realized by hardware.

For example, the data processing in the priority order decision portion 1821, handover execution portion 1822, and handover reservation portion 1823 in the main control portion 180, handover judgment portion 181, and handover processing portion 182 may be realized by using one or more computers and operating a program or software on that computer or at least a portion thereof may be realized by hardware.

Further, it is also possible to make a recording medium store such program, connect this to the computer, and run the program stored in the recording medium to perform the processing explained above.

The invention claimed is:

1. A communication terminal communicating with a network through a base station used for mobile communication, establishing a plurality of sessions, and capable of communication, the communication terminal comprising:

a handover judgment portion for judging whether or not handover is to be performed; and a handover processing portion for deciding priority orders of a plurality of sessions for handover when executing handover based on the judgment result of the handover judgment portion and when there are a plurality of the sessions in communication, and for performing the handover processing from the session having the highest priority order according to the decided priority orders.

2. A communication terminal as set forth in claim 1, wherein the handover processing portion computes scores based on the amounts of wireless resources of the sessions for the handover, and decides the priority orders in sequence from the session having the largest computed score.

3. A communication terminal as set forth in claim 2, wherein the handover processing portion judges for each session whether or not the session for handover is a session for which communication quality is to be guaranteed and, when it is the session for which communication quality is to be guaranteed, changes the value of its score so as to become a score larger than the score based on the amount of wireless resources of that session.

4. A communication terminal as set forth in claim 3, wherein, when the session is a session for which communication quality is to be guaranteed, the handover processing portion adds to the score based on the maximum usable amount of wireless resources of the session a predetermined value making the score based on the maximum usable amount of wireless resources larger.

5. A communication terminal as set forth in claim 3, wherein, when the session is a session for which communication quality is to be guaranteed, the handover processing portion multiplies the score based on the amount of wireless resources of the session by a coefficient of 1 or more to make the score based on the maximum usable amount of wireless resources larger.

6. A communication terminal as set forth in claim 1, wherein, when the request for changing a connection relationship with the network through the base station is made for a session during the handover processing, the handover processing portion reserves the request for changing the connection relationship until the handover processing in progress is completed.

7. A communication terminal as set forth in claim 6, wherein, the request for changing a connection relationship with the base station includes
a connection request for newly connecting a session, or
a disconnection request for disconnecting an existing session, and
wherein the handover processing portion processes the disconnection request for disconnecting an existing session with priority when there are both of the connection request for newly connecting a session and the disconnection request for disconnecting an existing session when resuming the reservation request for changing the connection relationship with the base station after the handover processing in progress completed.

8. A communication terminal as set forth in claim 7, wherein, the handover processing portion performs processing for a reservation connection request for newly connecting a session after processing the disconnection request for disconnecting the existing session.

9. A communication terminal as set forth in claim 1, wherein the handover processing portion has a priority order decision portion for deciding priority orders of the sessions for handover described in claim 1, and
a handover processing execution portion for executing the handover processing for the sessions for handover in accordance with priority orders decided by the priority order deciding portion.

10. A communication terminal as set forth in claim 9, wherein the handover processing portion further has a handover processing reservation portion for performing processing for changing the connection relationship described in claim 6.

11. A wireless communication system comprising:
a wireless communication network;
a plurality of base stations connected to the wireless communication network in order to realize mobile communication; and
a communication terminal which can be wirelessly connected to the plurality of base stations,
the communication terminal being configured communicate with one of the plurality of base stations, to establish a plurality of sessions and to enable the communication, and
the communication terminal having:
a handover judgment portion for judging whether or not handover is to be performed; and
a handover processing portion for deciding priority orders of a plurality of sessions for handover when the handover is executed based on the judgment result of the handover judgment portion and when there are a plurality of sessions in communication and for performing the handover processing from the session having the highest priority order according to the decided priority orders.

12. A wireless communication system as set forth in claim 11, wherein the handover processing portion of the communication terminal performs the handover processing from the session having the highest priority order defined in accordance with the value of a score defined according to the amount of wireless resources of a session and/or whether the session is a guaranteed communication quality type.

13. A wireless communication system as set forth in claim 11, wherein, when there occurs a connection request for newly connecting a session or a disconnection request for disconnecting an existing session which would change the connection relationship with the network through the base station for a session during the handover processing, the handover processing portion of the communication terminal reserves the request for changing the connection relationship until the handover processing in progress is completed.

14. A handover processing method of a mobile communication terminal, communicating with a network through a base station used for mobile communication, establishing a plurality of sessions for communication and enabling the communication, including:
a handover judgment step of judging whether handover is to be performed; and
a handover processing step of deciding priority orders of a plurality of sessions for handover when the handover is executed based on the judgment result in the handover judgment step and when there are a plurality of sessions in communication and of performing the handover processing from the session having the highest priority order according to the decided priority orders.

15. A handover processing method as set forth in claim 14, wherein, in the handover processing step it is performed the handover processing from the session having the highest priority order defined in accordance with the value of a score defined according to the amount of wireless resources of a session and/or whether the session is a guaranteed communication quality type.

16. A handover processing method as set forth in claim 14, wherein, when there occurs a connection request for newly connecting a session or a disconnection request for disconnecting an existing session which would change the connection relationship with the network through the base station for a session, during the processing of the handover processing step, in the handover processing step, it is performed the reservation of the request for changing the connection relationship until the handover processing is progress is completed.

17. A mobile communication terminal communicating with a network through a base station used for mobile communication, establishing a plurality of sessions for communication, and enabling the communication, the mobile communication terminal comprising:
a handover judging means for judging whether or not handover is to be performed and
a handover processing means for deciding priority orders of a plurality of sessions for handover when executing handover based on the judgment result of the handover judging means and when there are a plurality of sessions in communication and for performing the handover processing from the session having the highest priority order according to the decided priority orders.

18. A communication terminal as set forth in claim 17, wherein, when there occurs a connection request for newly connecting a session or a disconnection request for disconnecting an existing session which would change the connection relationship with the network through the base station for a session, during the handover processing, the handover processing means reserves the request for changing the connection relationship until the handover processing in progress is completed.

19. A non-transitory computer readable medium having embodied therein a handover processing program making a computer in a communication terminal execute functions of communicating with a network through a base station used for mobile communication, establishing a plurality of sessions for communication, and enabling the communication, the handover processing program including instructions comprising:
a handover judgment routine of judging whether or not handover is to be performed; and a handover processing routine of deciding priority orders of a plurality of sessions for handover when handover is executed based on the judgment result in the handover judgment routine and when there are a plurality of sessions in communication and of performing the handover processing from the session having the highest priority order according to the decided priority orders.

20. The non-transitory computer readable medium having embodied therein a handover processing program as set forth in claim 19, wherein, when there occurs a connection request for newly connecting a session or a disconnection request for disconnecting an existing session which would change the connection relationship with the network through the base station for a session during the handover processing, in the handover processing routine, it is performed the reservation of the request for changing the connection relationship until the handover processing in progress is completed.

* * * * *